United States Patent
Conway

(10) Patent No.: US 11,341,802 B2
(45) Date of Patent: *May 24, 2022

(54) BULK FOOD INTEGRATED SCALE SYSTEM

(71) Applicant: SmartBins Inc., Capitola, CA (US)

(72) Inventor: David Conway, Capitola, CA (US)

(73) Assignee: SMARTBINS INC., Capitola, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/803,685

(22) Filed: Feb. 27, 2020

(65) Prior Publication Data
US 2020/0193758 A1 Jun. 18, 2020

Related U.S. Application Data

(63) Continuation of application No. 15/423,197, filed on Feb. 2, 2017, now Pat. No. 10,665,051.

(51) Int. Cl.
| | |
|---|---|
| G07F 11/44 | (2006.01) |
| A47F 1/035 | (2006.01) |
| G07F 9/02 | (2006.01) |
| G07G 5/00 | (2006.01) |
| G06Q 20/14 | (2012.01) |
| G01G 19/414 | (2006.01) |
| G06Q 20/20 | (2012.01) |
| A47B 51/00 | (2006.01) |

(52) U.S. Cl.
CPC ............. *G07F 11/44* (2013.01); *A47F 1/035* (2013.01); *G01G 19/4144* (2013.01); *G06Q 20/145* (2013.01); *G06Q 20/209* (2013.01); *G07F 9/023* (2013.01); *G07G 5/00* (2013.01); *A47B 51/00* (2013.01)

(58) Field of Classification Search
CPC ............. G07F 11/44; A47F 1/03; A47F 1/035
USPC ........................................... 700/236
See application file for complete search history.

(56) References Cited

U.S. PATENT DOCUMENTS

| | | | | |
|---|---|---|---|---|
| 4,108,363 | A * | 8/1978 | Susumu ..................... | G07F 7/00 177/245 |
| 4,718,578 | A * | 1/1988 | Radek ....................... | A47F 1/03 141/317 |
| 5,437,393 | A * | 8/1995 | Blicher ..................... | A47F 1/03 141/369 |
| 6,241,123 | B1 * | 6/2001 | Elmore ..................... | A47F 1/03 222/129 |

(Continued)

OTHER PUBLICATIONS

US 10,655,051 B2, 06/2020, Conway (withdrawn)*

*Primary Examiner* — Timothy R Waggoner
(74) *Attorney, Agent, or Firm* — Lempia Summerfield Katz LLC

(57) ABSTRACT

The disclosure relates to systems and methods for a bulk bin dispenser. In one embodiment, the system includes a bulk bin dispenser configured to store a product with a distinct weight. The system further includes a digital scale configured to measure a change in weight of the bulk bin dispenser when a portion of the product is dispensed into a portable container, wherein the change in the weight is a dispensed weight of the portion of the product dispensed into the portable container. The system further includes a processor configured to transmit an associated cost for the portion of the product dispensed into the portable container to a store check-out system without printing a label for the dispensed weight.

12 Claims, 10 Drawing Sheets

(56) References Cited

U.S. PATENT DOCUMENTS

| | | |
|---|---|---|
| 2004/0267621 A1 | 12/2004 | Schuller |
| 2005/0269366 A1 | 12/2005 | Brundick |
| 2012/0029690 A1* | 2/2012 | Bruck .................... G07F 11/24 |
| | | 700/232 |
| 2012/0253509 A1 | 10/2012 | Garda |

* cited by examiner

BULK FOOD INTEGRATED SCALE SYSTEM

CROSS-REFERENCE TO RELATED APPLICATIONS

This application is a continuation application of U.S. patent application Ser. No. 15/423,197, filed Feb. 2, 2017, which is hereby incorporated by reference in its entirety.

FIELD

The following disclosure relates to the field of bulk bin dispensers and weight scale systems for bulk foods and sundries, and consumer interface systems to facilitate efficient bulk bin selection, measurement and purchasing. The disclosure further relates to an innovative integrated system for dispensing, weighing, identifying, processing, and printing bar codes or tag-identifiers. The system also functions as a hub for bulk food product pre-checkout functions.

BACKGROUND

With consumers seeking to be environmentally friendly, bulk foods are arguably the number one emerging consumer trend in the grocery industry. Some advantages of bulk food sections in grocery stores (e.g., unpackaged food in bulk bins) may include a consumer may purchase precisely the amount of food they desire, bulk foods may be 25% cheaper on average than packaged counterparts, and/or bulk foods may carry 40%-50% profit margins.

Current drawbacks to bulk food dispensing, even in the most modern grocery stores, may include a time-intensive or annoying series of tasks such as the following: grabbing a plastic bag from a roll, placing the bag beneath a gravity-bin or next to a scoop-style dispenser, pulling the dispenser lever or turn the dispenser crank or screw, walking with the bag to a weigh-station (such as an old-fashioned analog baker's scale), writing the product name and weight on a sticker-label or twist-tie with a felt pen, sticking the sticker-label on the plastic bag, using an old-fashioned twist-tie to close and secure the bag, walking to the checkout line with the bag, validating the bag weight and manually inputting the item's unit price and item number by a store clerk, and generating another receipt at purchase.

What is needed, therefore, is a device or system that modernizes and integrates these functions in a unique way that technologically solves these issues, so the customer may select a desired amount of his/her product, and the device or system handles certain processing and/or checkout functions automatically.

BRIEF SUMMARY

The disclosure relates to integrated systems for dispensing, weighing, identifying, processing, and/or printing tag identifiers for items (e.g., bulk food items).

In one embodiment, a system includes a bulk bin dispenser configured to store a product with a distinct weight. The system further includes a digital scale configured to measure a change in weight of the bulk bin dispenser when a portion of the product is dispensed into a portable container, wherein the change in the weight is a dispensed weight of the portion of the product dispensed into the portable container. The system further includes a processor configured to transmit an associated cost for the portion of the product dispensed into the portable container to a store check-out system without printing a label for the dispensed weight.

In another embodiment, a method for dispensing a product from a bulk bin dispenser includes providing the bulk bin dispenser containing a product with a distinct weight. The method further includes dispensing a portion of the product from the bulk bin dispenser into a portable container. The method further includes measuring, by a digital scale, a change in weight of the bulk bin dispenser when the portion of the product is dispensed into the portable container, wherein the change in the weight is a dispensed weight of the portion of the product dispensed into the portable container. The method further includes transmitting, by a processor, an associated cost for the portion of the product dispensed into the portable container to a store check-out system without printing a label for the dispensed weight.

In an additional embodiment, a system includes a bulk bin dispenser including a product with a distinct weight. The system further includes a digital scale configured to measure a change in weight of the bulk bin dispenser when a portion of the product is dispensed into a portable container. The system further includes a printer configured to generate a label with a digital code. The system further includes a controller configured to automatically prompt the printer to generate the label indicating a dispensed weight and/or an associated cost of the portion of the product dispensed into the portable container based on the measured change in the weight of the bulk bin dispenser.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The drawings described herein are for illustrative purposes only and illustrate selected embodiments of the present disclosure. The enclosed drawings are not intended to limit the scope of the present disclosure.

DETAILED DESCRIPTION

Figure 1A:
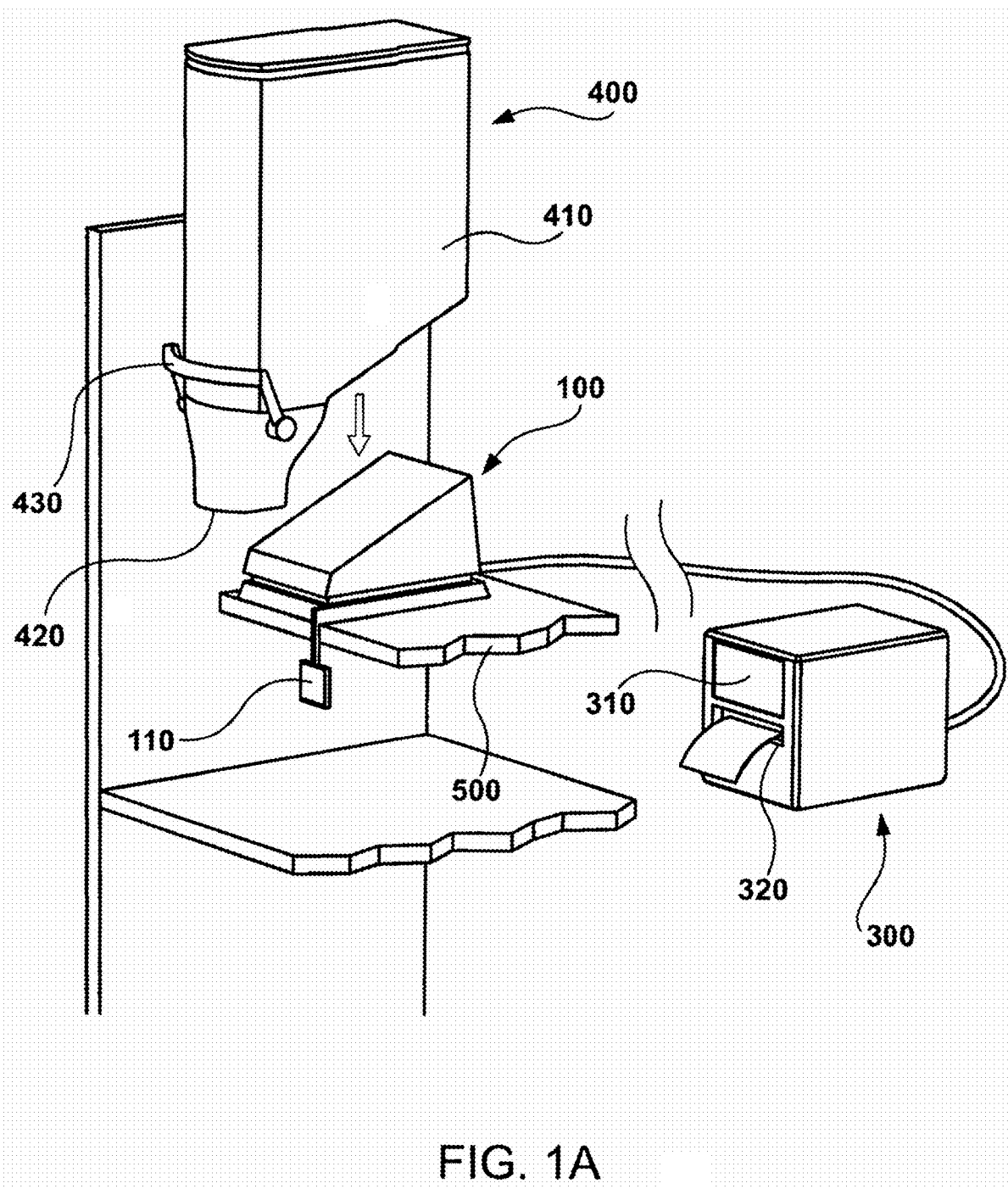
FIG. 1A depicts an angled side view of an example of an exterior of a bulk food dispenser with an integrated scale (herein as a pressure plate scale base, herein shown separated from the gravity bin hopper) and front-facing display (e.g., LCD or other electronic visual display monitor), and the central printing and user-interface kiosk station ("pre-checkout" station), generating a sticker-label including a barcode or RFID tag.

The devices and systems described herein provide solutions to bulk food and/or other items (e.g., dry goods or hardware items) that may be stored in a storage bin and sold in bulk.

The system disclosed here solves the current slow, cumbersome bulk food preparation process by, inter alio, positioning a digital scale underneath, behind, adjacent to, or into the gravity bin's bracket, then transmitting the item's weight to a centralized processor and then to a thermal printer which prints a UPC/SKU/QR Code bar code receipt onto a "luggage bag tag"-style sticky label, which can optionally be used in lieu of a traditional twist-tie to seal the customer's bag.

Based on the disclosure's "integrated scale" data, information about the bulk food item, price, and weight are automatically measured, transmitted and printed onto an adhesive thermal paper stock which is automatically dispensed at the system's "hub," or central kiosk area, where the consumer can look at a monitor display to verify the item, weight and price, and then grab the adhesive strip and use the strip to seal the bag. The hub can alternatively apply the sticky bag tag in an automated fashion via robotic arm or actuator.

Through these system steps, bulk food checkout more efficient for the consumer and for the store clerk, as the items are ultimately scanned like any other "factory packaged" item in the store. For oddly-shaped bulk foods or for liquid sundries like shampoo or oils or sauces, the receipt strip may also comprise a RFID Chip to aid the end-point laser scanner in checkout. Such optional chips solve potential problems of poorly printed, obscured, crumpled or damaged bar codes on the strip.

In the Summary above and in this Detailed Description, and the claims below, and in the accompanying drawings, reference is made to particular features (including method steps) of the disclosure. It is to be understood that the disclosure in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Any element in a claim that does not explicitly state "means for" performing a specified function, or "step for" performing a specific function is not to be interpreted as a "means" or "step" clause as specified in 35. U.S.C. § 112,r 6. Specifically, the use of "step of in the claims herein is not intended to invoke the provisions of U.S.C. § 112, paragraph 6.

Aspects of the disclosure may be embodied as a system, method or process, or computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the disclosure may take the form of a computer program product embodied in one or more computer readable media having computer readable program code embodied thereon.

Definitions

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

As used herein, the term "comprises" and grammatical equivalents thereof are used herein to mean that other components, ingredients, steps, among others, are optionally present. For example, an article "comprising" (or "which comprises") components A, Band C may consist of (i.e., contain only) components A, Band C, or may contain not only components A, B, and C but also contain one or more other components.

As used herein, the term "at least" followed by a number is used herein to denote the start of a range beginning with that number (which may be a range having an upper limit or no upper limit, depending on the variable being defined). For example, "at least 1" means 1 or more than 1.

As used herein, the term "at most" followed by a number (which may be a range having 1 or 0 as its lower limit, or a range having no lower limit, depending upon the variable being defined). For example, "at most 4" means 4 or less than 4, and "at most 40%" means 40% or less than 40%.

When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

As used herein, an "actuator" may refer to a component of the dispenser configured to respond to a control signal (e.g., from the hub processor) to open and/or close the dispenser chute.

As used herein, a "bulk food dispenser" may refer to the delivery component of the system. Examples are gravity bin dispensers, scoop bins, inversion bins, "loss-in-weight" gravimetric feeders, volumetric feeders, or any bulk food delivery mechanism for the systems described herein.

As used herein, a "chute" may refer to a spout section of a gravity-fed storage bin dispenser.

As used herein, a "controller" may refer to computer hardware which interfaces with a peripheral device. The hardware manages the operation of (and connection with) the peripheral device(s).

As used herein, a "customer display" may refer to an electronic display, such as a liquid crystal display (LCD) or any other method of displaying a "real-time" read-out of the amount of bulk food product dispensed from the dispenser's chute/spout. In certain embodiments, the customer display may be located adjacent to each dispenser. This customer display may be distinguished from the central hub processor's touchscreen interface display.

As used herein, a "dead end" may refer to an electrical circuit's ground.

As used herein, a "digital code" may refer to a machine-readable representation of data.

As used herein, a "hopper" may refer to replaceable/cleanable part of the gravity dispenser that stores the bulk food or other items.

As used herein, a "hub processor" may refer to a central processing unit of a system. In certain embodiments, the "hub" may include a touchscreen interface display and a (e.g., thermal) printer. The hub processor may be positioned in a bracketed slot for a bulk bin dispenser. In certain aspects, the hub functions as the system's central customer touchscreen and printout station.

As used herein, a "load cell" may refer to a type of digital scale, in which a transducer is used to create an electrical signal whose magnitude is directly proportional to the force (e.g., weight) being measured. The force may be loaded onto a top plate, which may be mounted above a base plate, with a spacer plate, or "spacer," positioned between the load cell and the base.

As used herein, a "mechanical container sealer" may refer to a machine used to seal packaging products, e.g., using heat.

As used herein, an "optical reader" may refer to an electronic device that may read and output printed barcodes to a computer. The optical reader may include decoder circuitry configured to analyze a barcode (or QR Code)'s image data provided by the sensor and send the barcode's content to the scanner's output port. Common bar code readers, and even smartphones with cameras, may act as optical readers.

As used herein, a "payment account" may refer to a method by which a customer pays a merchant, (e.g., a credit card), but may also be an online customer account processed through a server, such as an online account, an Amazon™ account, or a Venmo™ account.

As used herein, a "pressure plate" may refer to a digital scale including a weighing mechanism or device for weighing articles (e.g., bulk food items). The pressure plate may also be configured to generate and couple an electronic signal signifying the weight of the article (e.g., bulk food) being measured. For purposes of this disclosure, "load cell" and "strain gauge scale" are functionally interchangeable.

As used herein, a "quick response code" or "OR code" may refer to a matrix barcode, machine-readable (e.g., by an imaging device supplied at checkout) optical label containing information about the item to which it is attached, used for item tracking identification checkout and marketing.

As used herein, a "receipt" may refer to the system's printed checkout identifier (e.g., UPC/SKU/QR code or RFID tag or other optical scanning identifier) for checkout. In certain embodiments of the system, the receipt is printed on/as the "bag tag," rather than forcing a customer to use an old-fashioned twist tie. In other examples, in an "Amazon Go™"-type system, a printed checkout receipt/identifier would consequently be an unnecessary element of the system.

As used herein, a "RFID tag" may refer to a chip identifier attached to an object. The identifier may include electronically stored information which an RFID reader's interrogating radio waves collect and interpret to provide automatic identification and data capture about the item, e.g., including weight unit price and total price.

As used herein, a "scale" may refer to a strain gauge scale, digital load cell, pressure plate, hanging spring scale, or any weight scale configured to electronically transmit the weight of an article (e.g., bulk food item) being dispensed from a storage bin to a system's hub processor/kiosk and display(s). Digital spring scales, strain gauge scales, hanging spring or digital load cells, or any electronic scale may be used in the embodiments disclosed herein.

As used herein, a "stock keeping unit" or "SKU bar code" may refer to a code similar to a UPC bar code, but distinct for inventory management and other entity tracking methods.

As used herein, "thermal paper" may refer to a special fine paper coated with a chemical that changes color when exposed to heat. The paper may be used in cash registers and credit card terminals, and herein may be used in the customer's "sticky bag tag" receipt.

As used herein, a "thermal printer" may refer to a printer having small heated pins configured to form characters on heat-sensitive paper.

As used herein, a "touchscreen interface" may refer to a touch-screen user input/output device. In certain embodiments, the interface display is positioned at the system's hub processor.

As used herein, a "universal product code" or "UPC bar code" may refer to a machine-readable representation of data useful for supermarket, or other checkout systems, by using automatic identification and data capture.

As used herein, a "volumetric reader" may refer to a bulk food dispenser configured to measure the amount of dispensed product by measuring flow rate and multiplying by length of dispensation. Volumetric feeders, which do not use "weight scales," may be primarily used for liquids and other items not usually found in gravity bins. These feeders use the above "flow rate measuring method," which is compatible with the instant system.

As used herein, the singular forms "a," "an," and "the" include plural referents unless the context clearly dictates otherwise.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

FIG. 1A depicts a simplified embodiment of the disclosure. The integrated scale 100, (e.g., a digital strain gauge scale or load cell or "pressure plate"), is positioned below a bulk food bin dispenser 400 hopper bin 410. The scale 100 is uniquely designed to fit underneath the hopper of the gravity bin. In this illustrated embodiment, the system's physical components rest on a shelf 500. The integrated scale 100 functions as a digital scale, calibrated to measure changes in the weight of bulk food in the dispenser. When the customer pulls down the dispenser lever 430 and waits for the desired amount of food to fall through the valve in the chute 420, the integrated scale 100 senses the difference in weight and transmits this data to a central hub processor 300, which processes the weight difference. The hub processor 300 then sends this information back to the customer's label-display as a readout on an electronic visual display 110, e.g., an LCD monitor. Alternatively, the processor can query the scale 100 at a set time interval, and the scale 100 will send a transaction report to the touchscreen user interface 310 and printer 320 of the hub processor 300.

The hub processor 300 can alternatively be connected to any number of dispensers, printers and user interfaces, either locally or remotely. Alternatively, the display 110 can be shown as any display or label substantially near the dispenser 400. The dispensed-food's weight is also transmitted to the printer 320, which generates a receipt or transaction report with a barcode and product information and indicates the important receipt information on the touchscreen interface display 310 of the hub processor 300. Receipt information may contain the dispenser bin number (not shown), the type of bulk food product (e.g. coffee beans, rice, granola, etc.), the unit price, the portion weight, the item's total price, and other receipt identifiers programmed by the grocer into the hub processor 300 during initial formatting and set-up. The hub processor 300 may also be accessed to research prior transactions. Errors may be fixed via the touchscreen interface 310. The System's preferred embodiment for the printer's 320 receipt is a sticky Bar-Coded Bag Tag, in the same fashion as airline luggage bag tags, sealing the customer's receptacle bag in addition to functioning as an identifier. New, or replacement receipts (bar coded sticky bag tags) can be generated at the customer's behest.

The scale 100 and hub processor 300, display 310 and printer 320 are "integratable," in that these aspects of the system may be infused into existing, non-automated bulk food dispensing systems in order to modernize them.

Figure 1B:
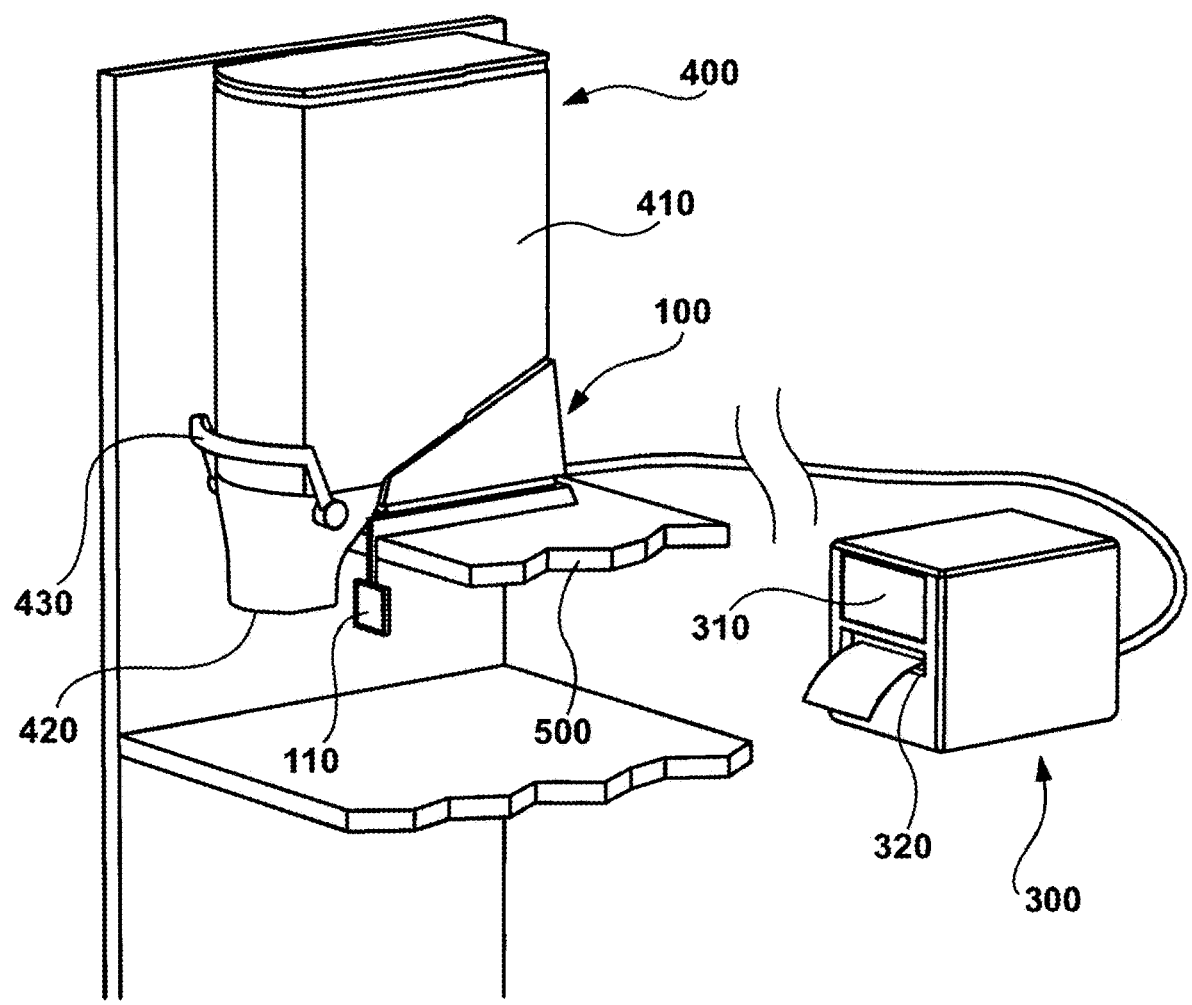
FIG. 1B depicts an angled side view of an example of a bulk food dispenser including the electronic visual display monitor, with the integrated scale underneath (herein shown assembled), wherein the integrated scale is connected to the printer (herein shown without touchscreen).
Figure 5A:
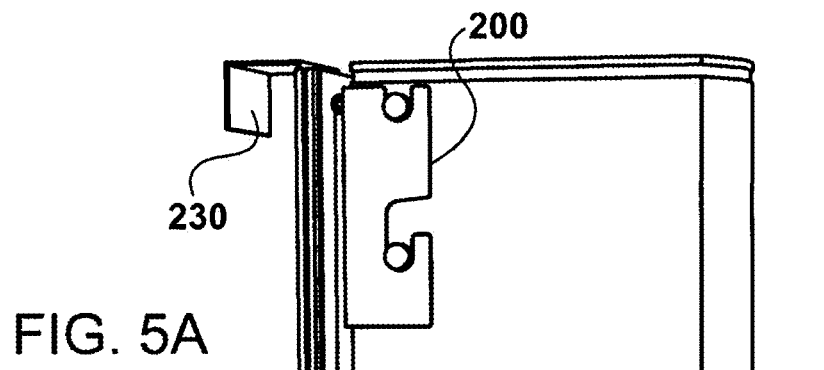
FIG. 5A depicts a side view of an example of dispenser and scale components of the storage system in which the integrated scale is mounted between the bracket arms and the wall, door or rack-tower via "over the door" hook, with the bracket arms in upright position.

FIG. 1B is the same "stripped-down" embodiment of the System as that in FIG. 5A, herein shown with the hopper 410 resting on the scale 100 as it would be positioned when installed.

Figure 2:
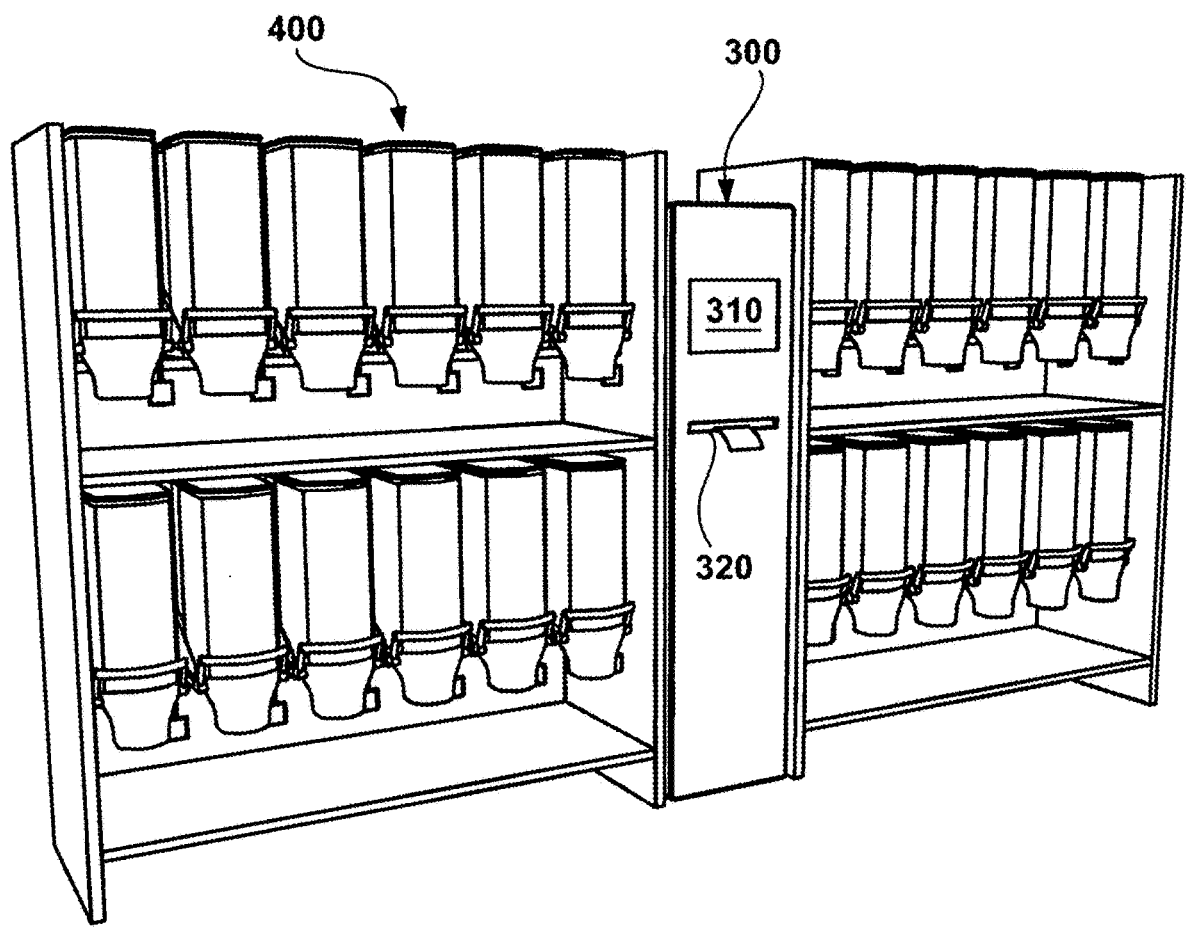
FIG. 2 depicts an angled front view of an example of a bank, or two-tiered tower, of two rows of bulk food dispensers in a rack-tower layout, with the central customer touchscreen kiosk and printout station in the middle of the dispenser rows. A scale may be integrated into each individual dispenser, or into each chute component, either below the drum or compartment-valve, or may be mounted as a hanging spring-scale or digital load cell beneath each dispenser.

FIG. 2 is an angled view of the front of a bank layout of two rows of bulk food dispensers, with the central customer touchscreen and printout station (including the hub processor 300) positioned in the middle of the dispenser rows as a central kiosk in the embodiment shown. In alternative embodiments, the scale can be integrated into the dispenser chute 410, either below the drum or screw or compartment-valve. The scale may alternatively be mounted as a hanging spring-scale or digital load cell beneath. Here, each gravity bin 400 utilizes a scale attached to/integrated with its rear bracket mount to measure the change in weight associated with a customer's purchase (these "bracket-scales" are featured in FIGS. 3-5, infra). The scale then electronically transmits the digital data (re: food portion weight, unit price, etc.) to the hub processor 300, which then processes, stores and transmits receipt info to the printer 320 and the user touchscreen interface 310.

Figure 3A:
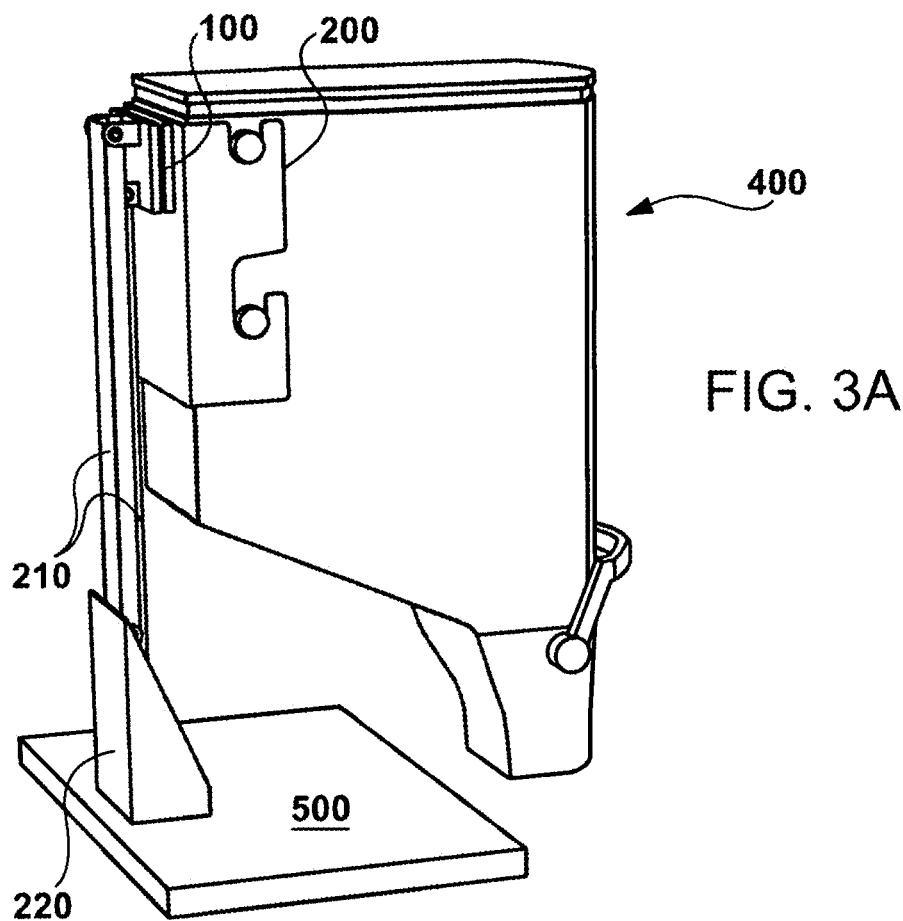
FIG. 3A depicts a side-rear view of an example of dispenser and scale components of a storage system. In this embodiment, the integrated scale is mounted behind the gravity dispenser bracket's connecting piece, with the bracket arms in upright position.

FIG. 3A depicts the System wherein the scale 100 is a strain gauge scale 100 integrated into the bin's 400 mounting bracket 200. The gravity bin 400 is attached to a bracket 200, which is attached to the strain gauge scale 100, which measures strains on its internal beams to process weight changes. In this embodiment, the strain gauge scale 130 senses the change in compression at its front-side beam, digitally processing this information into a "change in weight Delta," then transmitting this information to the System's hub processor 300.

The dispenser bracket arms 210 can be extended forward for easy access to the bin. The unit shown has a molded base stand 220. In alternative embodiments, the molded base stand 220 can also comprise the scale 100. In the embodiment shown, these working components rest on a base shelf 500, which also can comprise the scale 100.

Figure 3B:
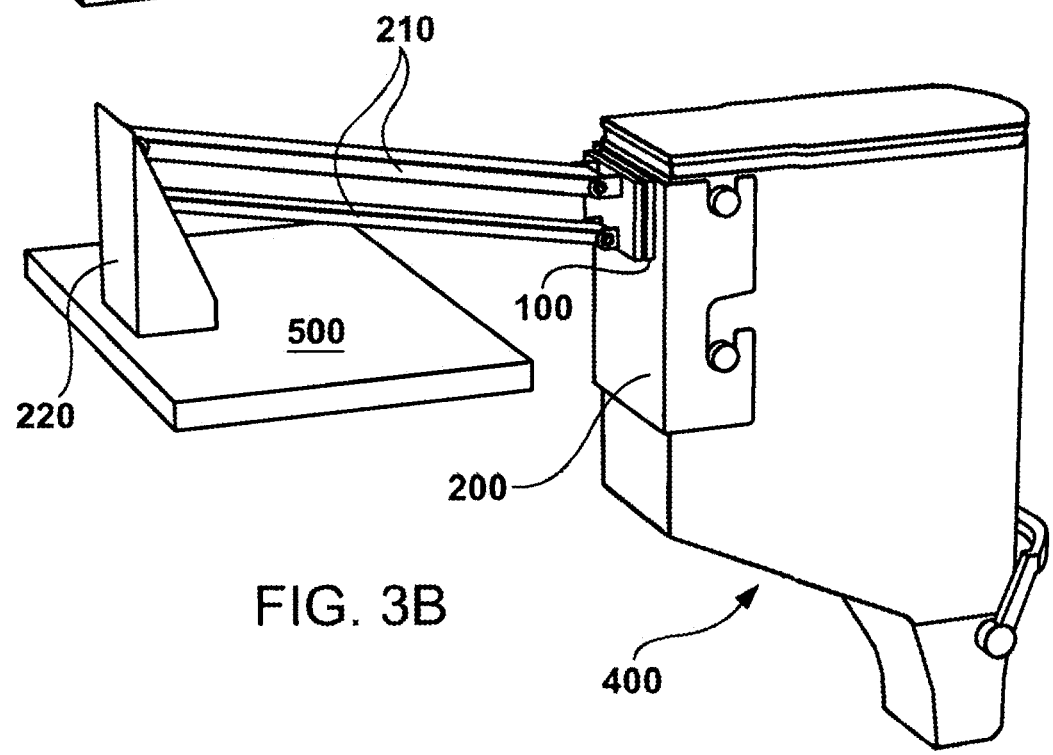
FIG. 3B depicts a side view of an example of dispenser and scale components of the storage system. In this embodiment, the integrated scale is mounted behind the dispenser bracket's connecting piece, with the bracket arms in an outstretched (e.g., horizontal) position.

FIG. 3B illustrates the bracket-scale components of the System with the bracket arms 210 positioned forward.

Figure 4A:
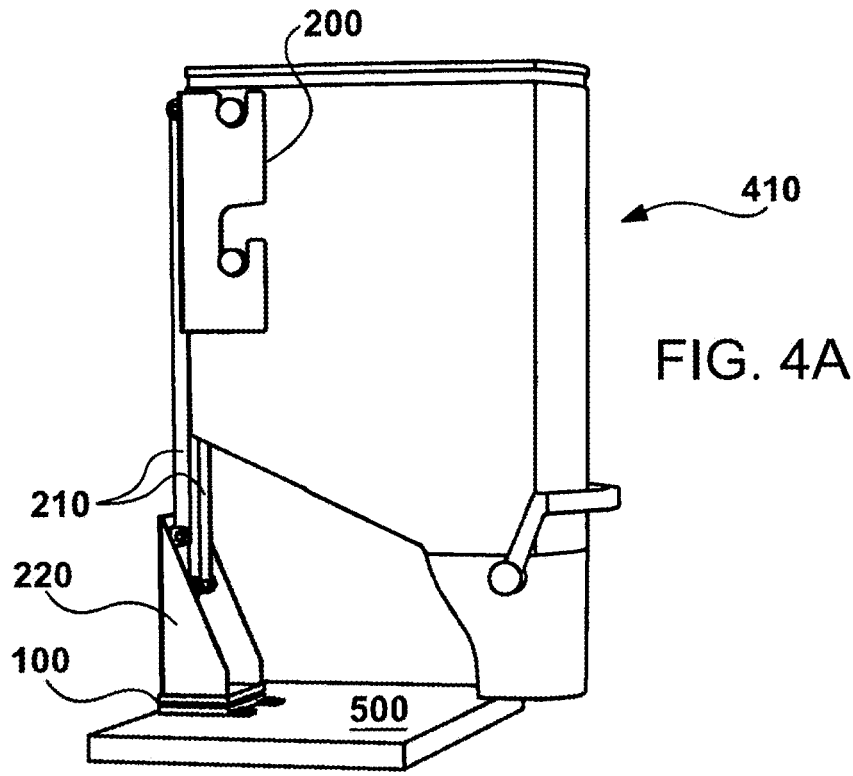
FIG. 4A depicts an angled-side view of an example of dispenser and scale components of the storage system. In this embodiment, the integrated scale is positioned underneath the dispenser bracket's base-stand, with the bracket arms in upright position. The integrated scale shown herein is a digital load cell, otherwise known as a "pressure plate" scale.

FIG. 4A illustrates an embodiment of the System wherein the integrated scale 100 is a pressure plate scale positioned underneath the bracket base 220. The bin hopper's 410 notches, or bolts, rest on the mounting bracket 200. In this embodiment, the integrated scale 100 is positioned underneath the base stand 220 between the shelf 500 and the base stand 220. The bracket arms 210 remain in a substantially vertical position, parallel with a wall or rack behind the gravity bin hopper 410.

Figure 4B:
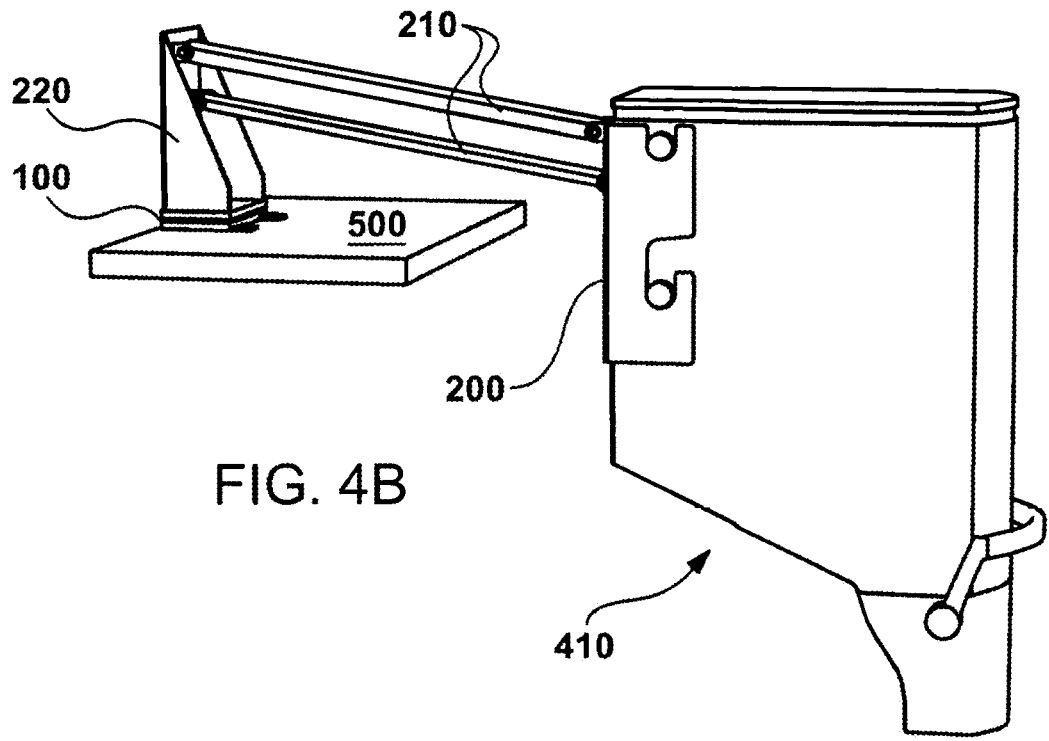
FIG. 4B depicts an angled-side view of an example of dispenser and scale components of the storage system. In this embodiment, the integrated scale is positioned underneath the dispenser bracket's base-stand, with the bracket arms in a substantially horizontal-outstretched position. The scale shown is a digital load cell, otherwise known as a "pressure plate" scale.

FIG. 4B illustrates the same embodiment as that shown in FIG. 8A, with its bracket arms 210 positioned forward, toward the customer for easy food dispensing.

FIG. 5A illustrates an embodiment of the System wherein the scale 100 is integrated or built into the wall-plate section of the bracket 200. The bracket 200 and scale 100 are then mounted to a wall, rack or display tower via an "over the door" hook 230.

Figure 5B:
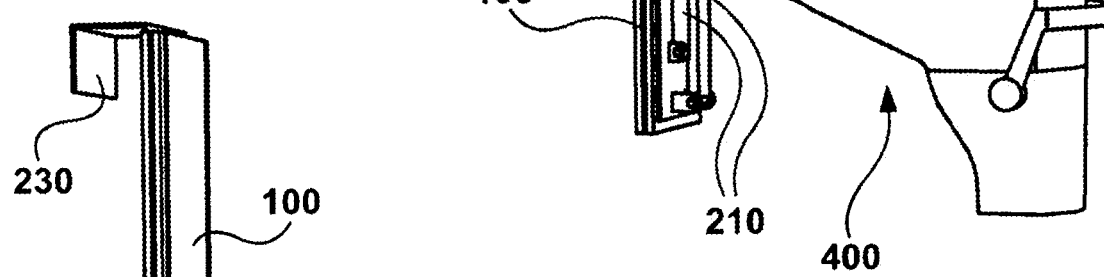
FIG. 5B depicts a side view of an example of dispenser and scale components of the storage system in which the integrated scale is mounted between the bracket arms and the wall, door or rack-tower via "over the door" hook, with the bracket arms in a substantially horizontal, outstretched position.
Figure 5B:
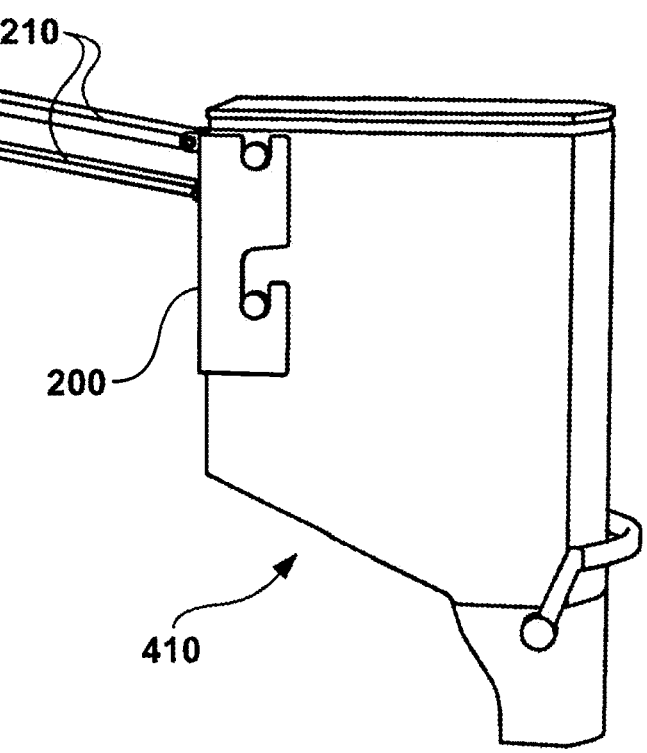

FIG. 5B illustrates the same embodiment as that shown in FIG. 9A, with its bracket arms 210 positioned forward for easy customer food dispensing.

Figure 6:
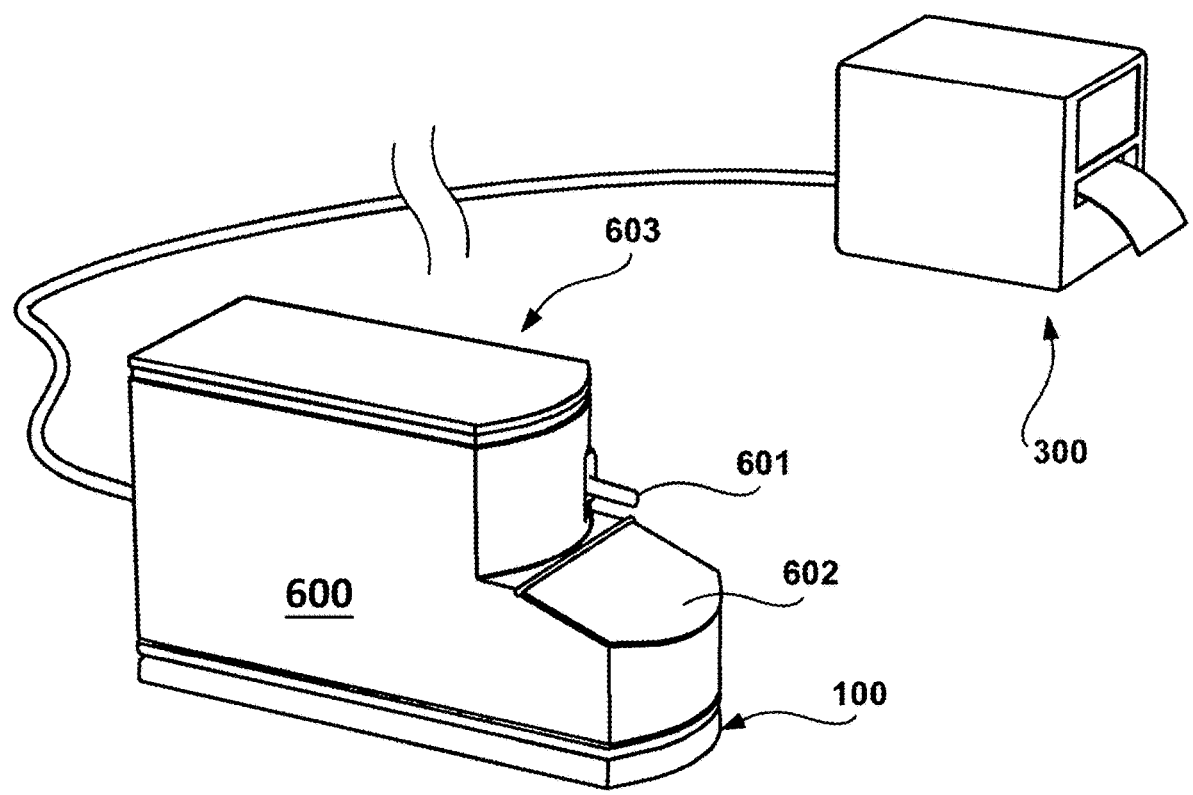
FIG. 6 depicts an angled-side view of an example of the storage system having a scoop bin. In this embodiment, the pressure plate integrated scale is positioned underneath the scoop bin.

FIG. 6 shows the System with a Scoop Bin 600 rather than a gravity bin. Here, a pressure plate scale 100 serves as the System's integrated scale 100. The shovel-type scoop 601, or tongs, rest in a scoop holder. The scoop bin 600 has a door 602 which the customer opens to scoop out their desired bulk food portion. The grocer refills the bin 600 via the lid 603. The scale 100 shown herein is a pressure plate scale 100 positioned under the scoop bin 600, or alternatively built into the base of the scoop bin 600. The System transmits weight and identifying information to the hub processor 300 as in other embodiments.

Figure 7:
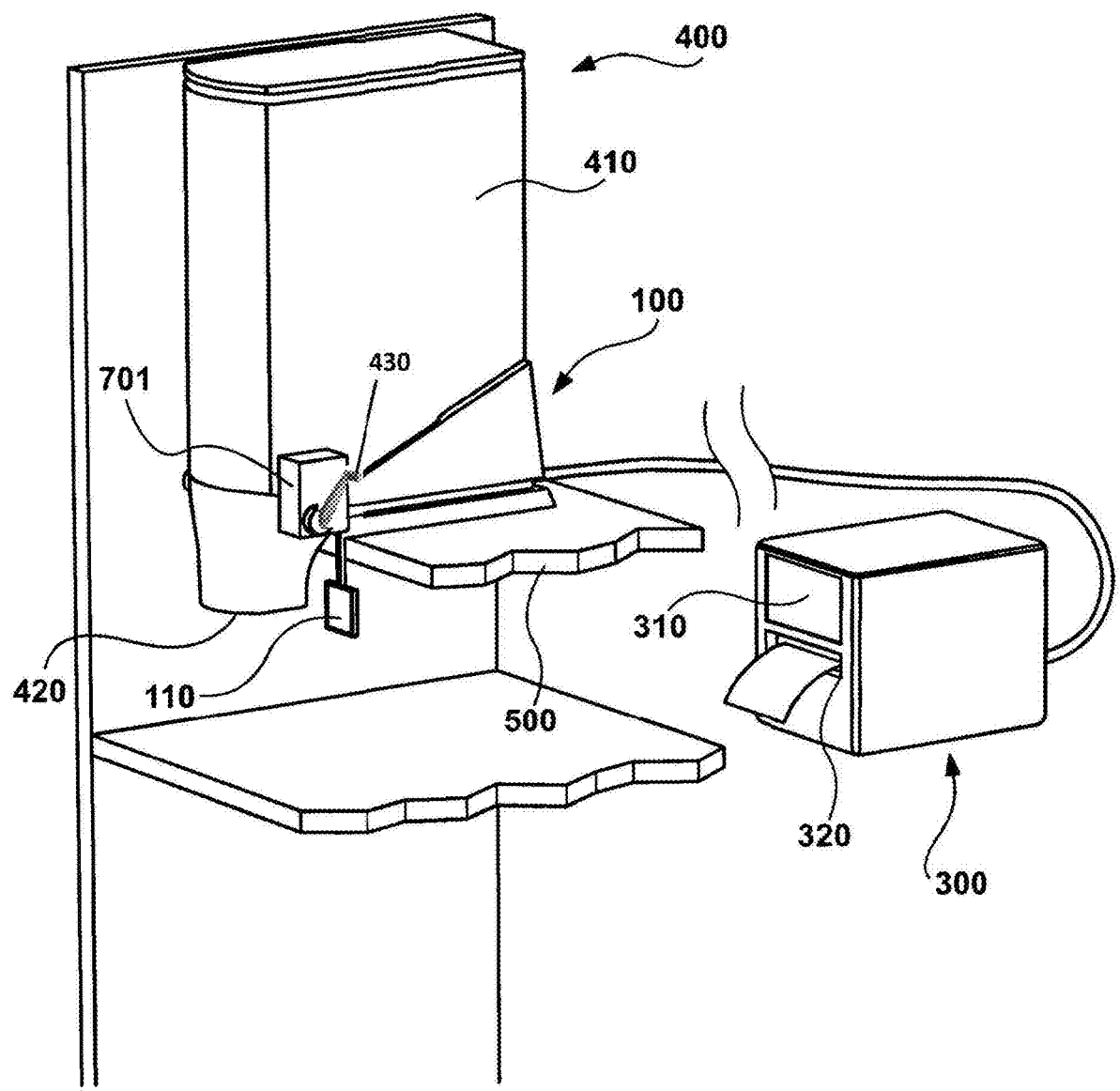
FIG. 7 depicts an angled-side view of an example of the storage system in which the customer's portion of bulk food may be dispensed automatically, without the customer using a hand-lever or dispensing handle. In this embodiment, a valve-actuator replaces the hand-crank/hand-lever component of the dispenser. In this embodiment, the actuator box and internal actuator axle (not shown) are configured to open and close the dispenser chute's valve.

FIG. 7 illustrates a "Smart Dispenser" embodiment of the System in which the customer's portion of bulk food is dispensed automatically, without the customer needing to use a hand-lever or crank 430. In the embodiment shown, an actuator 701 replaces the hand-lever component of the dispenser. In this embodiment, when the customer inputs their desired portion into the touchscreen interface 310, the hub processor 300 prompts the actuator 701 box to rotate the internal actuator axle (not shown) to open the dispenser chute's 420 valve.

In this embodiment, the customer chooses the product and desired portion via the touchscreen interface 310, and the bulk food comes out of the chute 420 into the customer's bag. In an alternative embodiment, a bank of hoppers (similar to FIG. 6) each may feed into the same chute 420, eliminating the need for a wall, or bank of chutes 420. Alternative "fully-automated" Systems feature a keypad next to each "Smart Dispenser," and the dispenser measures portions by flowrate or change-in-volume (volumetric feeders), thereby dispensing the customer's desired portion.

Figure 8:
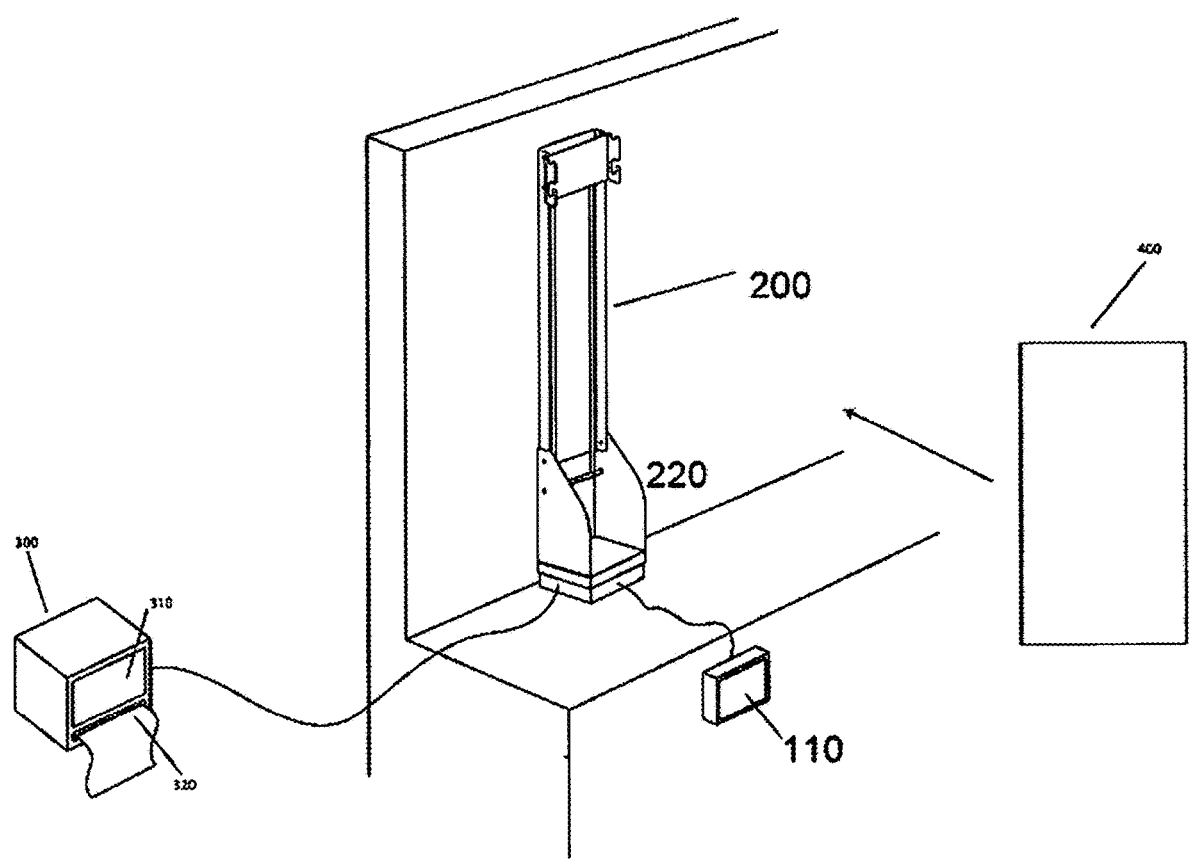
FIG. 8 depicts a landscape front view of an example of the storage system. In this embodiment, the integrated scale is positioned underneath the dispenser's bracket base. The bracket does not have hinged moveable arms, but rather the gravity dispenser fits into the wall bracket, which is fixed against a shelf, rack, tower or wall type fixture. In addition to the central touchscreen display, an individual screen is positioned in front of the scale and within the immediate purview of the customer, configured to display the customer the item, portion dispensed, price, and other indicators discussed herein.

FIG. 8 is a landscape front view of one embodiment of the System. In the embodiment shown, the integrated scale 100 is positioned underneath the dispenser's bracket base 220. In the embodiment shown, the bracket 200 does not have hinged moveable arms, but rather the gravity dispenser 400 (herein shown as "black box") fits into the wall bracket 200 by resting in the bracket's 200 top notches. The bracket 200 is fixed against a shelf, rack, tower or wall fixture. In addition to the central touchscreen interface 310 display, the embodiment shown features an individual display screen 110 positioned in front of the scale 100 and within the immediate purview of the customer, easily showing the customer the item, portion dispensed, unit price, price of portion, and other indicators discussed infra. In alternative embodiments, the individual screen 110 can be replaced by a label showing the same information, either in electronic, written and/or audible form.

Figure 9:
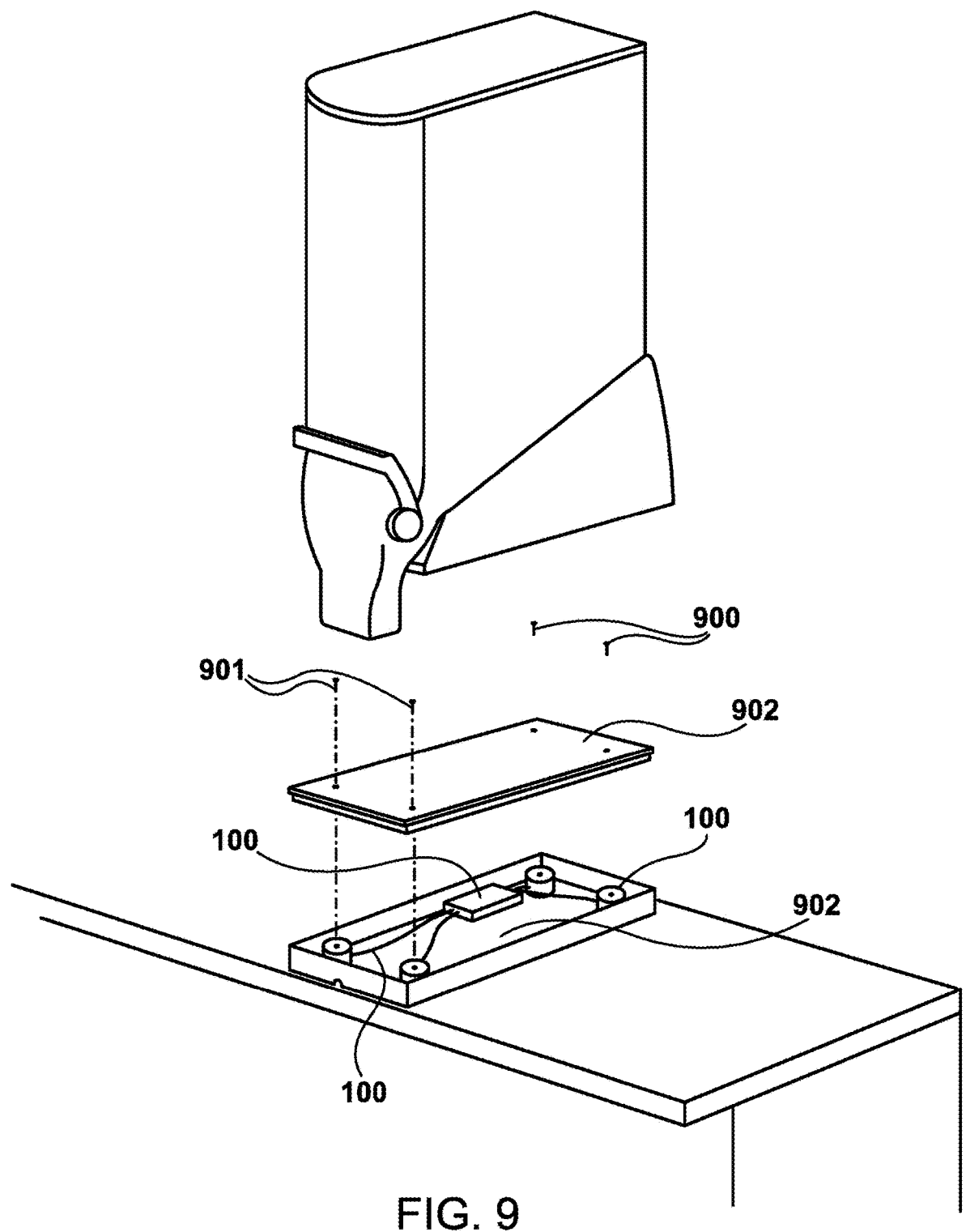
FIG. 9 depicts a landscape, exploded view example of a pressure plate load cell integrated scale in the storage system. In this embodiment, the positioning of various components digital load cell, or pressure plate, are shown (while the remainder of the hub processing and printing features are not shown).

FIG. 9 is a landscape, exploded view of the System, this embodiment featuring a pressure plate load cell integrated scale 100. In the embodiment shown, the positioning of various components of the digital load cell 100, or "pressure plate," are shown. The remainder of the hub processing 300 and printing 320 features not shown in FIG. 13.

In this sample embodiment, installation of the integrated scale 100 System into a preexisting, bracketed gravity bulk food dispenser 400 proceeds as follows: drill adequate number of holes into shelf 500 or foundation; bolt 901 down a base plate 902 between foundation shelf 500 and scale 100; install integrated scale 100 (digital load cell, pressure plate) above the spacer 903 by untightening the spacer bolts, fitting the load cell (scale 100) above the spacer 903; screw the dead end of the load cell 100 into the horizontal base plate 902; proceed to retightening and aligning bolts 901; then connect and calibrate load cell 100 with processor 300 (not shown) for accurate weight detection, transmission, processing and display at label display 110 and central hub processor 300 LCD display (not shown).

In certain embodiments, the system (e.g., of FIGS. 1-5B) includes a printed checkout receipt 320 such as an airport luggage-style "bag-tag," which includes bar-coded identifiers, yet remains sufficiently light and pliable to automatically tie and secure the customer's bag.

In certain embodiments, for liquids and other bulk items that do not dispense efficiently via gravity bins or bulk bin hoppers, (e.g., shampoos and oils), the system includes a volumetric feeder, measuring product weight via average flow rate or simple change-in-volume detector(s). The remainder of the system steps are substantially the same. For these liquid-variety items, the print[ed] 320 sticky receipt would either conform to liquid containers or would transmit directly to checkout in a "check-out-less" fully-computerized automated store system.

In certain embodiments, the system includes a "smart bin dispenser" which utilizes a "start and stop" function which identifies when the customer begins to use the dispenser and when the user has finished. One embodiment of this "smart bin dispenser" system is featured in FIG. 7, featuring an actuator 701 in place of the hand crank 430.

A working variation of this embodiment covers "receipt-less" transactions in stores in which bar-code optical scanning and/or RFID-Tags digitally replace the checkout process, such as Amazon-Go™, type Systems. In such instances, the instant System works without the printing 320 aspect of the hub processor 300. In place of a print[ed] 320 receipt, the bulk product identifiers (e.g., unit price, weight, total price, and other useful information infra) are processed through the System's hub processor 300 into the store's Network-Checkout Application in the same way the System Application processes the store's digitally-labeled packaged-foods. The instant System's hub processor 300 may therefore be decentralized or linked via computer network Server.

In certain embodiments, a touchscreen interface of the system allows the customer and the store to process mistakes for re-dispensation and labeling.

In certain embodiments, the controller of the system fits into the space wherein a bulk-bin dispenser would be in a row, or rack, of such dispensers.

In certain embodiments, the bin dispenser, or gravity bin, is a "smart bin," which allows the customer to choose their portion of food by punching their desired food portion directly onto the bin, which comprises a CNC (computer numerical control) or NC (numerical control) board directly on the bin.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the disclosure. The claims should not be read as limited to the described order or elements unless stated to that effect. Therefore, all embodiments that come within the scope and spirit of the following claims and equivalents thereto are claimed as the disclosure.

The invention claimed is:

1. A system comprising:
    a bulk bin dispenser comprising a product with a distinct weight;
    a controller;
    a digital scale configured to measure a change in weight of the bulk bin dispenser when a portion of the product is dispensed into a portable container, wherein the digital scale is configured to transmit the measured change in the weight to the controller; and
    a printer configured to generate a label with a digital code, wherein the controller is configured to automatically prompt the printer to generate the label indicating a dispensed weight and/or an associated cost of the portion of the product dispensed into the portable container based on the measured change in the weight of the bulk bin dispenser.

2. The system of claim 1, further comprising:
    a display configured to show information related to the product in the bulk bin dispenser.

3. The system of claim 2, wherein the display is configured to show the dispensed weight of the portion of the product dispensed into the portable container.

4. The system of claim 1, wherein the bulk bin dispenser is a bulk bin food dispenser, and
    wherein the product is a food item.

5. The system of claim 2, wherein the display is configured to show the associated cost of the portion of the product dispensed into the portable container.

6. The system of claim 2, wherein the display comprises a touchscreen interface.

7. The system of claim 6, wherein the bulk bin dispenser comprises an actuator triggered to open and dispense the portion of the product from the bulk bin dispenser by the touchscreen interface, and
    wherein a customer is configured to select the portion of the product to be dispensed via the touchscreen interface.

8. The system of claim 1, wherein the bulk bin dispenser is a gravity bin.

9. The system of claim 8, wherein the gravity bin comprises a lever, and
    wherein a customer is configured to dispense the portion of the product by moving the lever.

10. The system of claim 8, wherein the gravity bin comprises a hand crank, and
    wherein a customer is configured to dispense the portion of the product by turning the hand crank.

11. The system of claim 1, wherein the bulk bin dispenser is a scoop bin.

12. The system of claim 1, wherein the digital scale comprises a load cell.

\* \* \* \* \*